(12) United States Patent
Yoshimura

(10) Patent No.: US 7,001,028 B2
(45) Date of Patent: Feb. 21, 2006

(54) METHOD AND DEVICE FOR PREVENTING DEW CONDENSATION AND FROSTING ON OPTICAL GLASS WINDOW

(75) Inventor: Hirokazu Yoshimura, Saitama (JP)

(73) Assignee: Japan Science and Technology Agency, Kawaguchi (JP)

( * ) Notice: Subject to any disclaimer, the term of this patent is extended or adjusted under 35 U.S.C. 154(b) by 46 days.

(21) Appl. No.: 10/497,162

(22) PCT Filed: Oct. 2, 2002

(86) PCT No.: PCT/JP02/10257

§ 371 (c)(1),
(2), (4) Date: Jun. 8, 2004

(87) PCT Pub. No.: WO03/050585

PCT Pub. Date: Jun. 19, 2003

(65) Prior Publication Data

US 2005/0007665 A1    Jan. 13, 2005

(30) Foreign Application Priority Data

Dec. 12, 2001   (JP)   .............................. 2001-378109

(51) Int. Cl.
*G02B 1/00*       (2006.01)
*G02B 7/00*       (2006.01)
*G05D 23/00*      (2006.01)

(52) U.S. Cl. ...................... 359/512; 359/507; 359/900; 219/210

(58) Field of Classification Search ................ 359/507, 359/512, 900; 219/201
See application file for complete search history.

(56) References Cited

U.S. PATENT DOCUMENTS

| 2,442,913 | A | * | 6/1948 | Abrams et al. | ............. 359/820 |
| 2,879,424 | A | * | 3/1959 | Garbuny et al. | ............... 345/65 |
| 5,343,018 | A | * | 8/1994 | Limbach | ..................... 219/200 |
| 5,470,710 | A | * | 11/1995 | Weiss et al. | ................... 435/6 |
| 6,198,949 | B1 | * | 3/2001 | Braig et al. | ................. 600/310 |
| 6,518,068 | B1 | * | 2/2003 | Gambini et al. | ............. 436/50 |
| 6,825,978 | B1 | * | 11/2004 | Khurana et al. | ............ 359/368 |

FOREIGN PATENT DOCUMENTS

| JP | 4-135076 | 12/1992 |
| JP | 5-34605 | 2/1993 |
| JP | 7-236077 | 9/1995 |
| JP | 7-281291 | 10/1995 |

\* cited by examiner

*Primary Examiner*—John Juba, Jr.
(74) *Attorney, Agent, or Firm*—Oblon, Spivak, McClelland, Maier & Neustadt, P.C.

(57) ABSTRACT

A method and an apparatus are provided for preventing formation of dew and/or ice on an optical glass window, with which formation of dew and/or ice is easily and simply prevented while an air turbulent disturbance is minimized and a deformation is inhibited as little as possible. A protective tube (6) covering an external atmosphere of a cooled optical glass window (2) and thermally insulated from the optical glass window (2) is provided so as to prevent the external atmosphere from being cooled in order to prevent the optical glass window (2) from having dew and/or ice formed thereon.

7 Claims, 3 Drawing Sheets

(a)

(b)

METHOD AND DEVICE FOR PREVENTING DEW CONDENSATION AND FROSTING ON OPTICAL GLASS WINDOW

TECHNICAL FIELD

The present invention relates to a method and an apparatus for preventing formation of dew and/or ice on a glass window such as a glass sheet or lens which seals a CCD camera.

BACKGROUND ART

In recent years, a digital camera equipped with a CCD has been widely used not only for research purposes but also for general purposes. The inside of the camera for research purposes is often cooled down to minus 70 degrees Celsius in order to get the best performance of the CCD.

FIG. 1 is a perspective view of a known CCD camera, and reference numbers 101, 102, 103, and 104 represent a vessel, a front flat glass sheet, an evacuated portion, and a CCD sealed in a vacuum, respectively.

With this structure, the vessel 101 having the CCD 104 stored therein is evacuated close to a vacuum. The flat glass sheet 102 is provided in front of the CCD 104 so as to tightly seal the vessel 101. Since the inside of the CCD camera is cooled, when the humidity of outside air 105 exceeds a certain limit, dew or droplet of water is formed on the glass sheet 102 even when the humidity of the outside air 105 is not 100%, thereby making the CCD camera useless. To avoid the above-mentioned phenomenon, a variety of methods have been devised and applied. For example, a method of blowing dry nitrogen gas onto a glass surface, a method of blowing heated air onto a glass surface, a method of heating the entire CCD camera, and so forth were devised.

DISCLOSURE OF INVENTION

Unfortunately, the foregoing known methods for preventing formation of dew and/or ice on a glass surface have problems and are therefore unsatisfactory.

Particularly, since heating the entire camera causes a difference in temperatures between the vessel and the inside of the camera, the vessel tightly sealed so as to be evacuated is deformed, thereby causing not only risking the maintenance of its vacuum state but also consuming more energy for heating the entire camera. This is an essential factor to be taken into consideration when the entire camera is heated in the open air by a battery or the like. Also, the method of blowing dry nitrogen gas or heated air onto a glass surface causes a disturbance in the air, thereby deforming an image received on the CCD surface due to an air turbulence phenomenon, in addition to having a problem of availability of dry nitrogen.

In view of the foregoing problems, an object of the present invention is to provide a method and an apparatus for preventing formation of dew and/or ice on an optical glass window, with which formation of dew and/or ice on an optical glass window is easily and simply prevented while disturbance is minimized and a deformation is inhibited as little as possible.

In order to achieve the above object, the present invention has been made. In accordance with one aspect of the present invention,

[1] A method for preventing formation of dew and/or ice on an optical glass window includes the step of preventing an external atmosphere of the optical glass window from being cooled by providing a protective tube covering the external atmosphere of the cooled optical glass window and insulated from the optical glass window so as to prevent the optical glass window from having dew and/or ice formed thereon;

[2] In the method for preventing formation of dew and/or ice on an optical glass window set forth in [1], the protective tube is formed so as to be tightly sealed;

[3] In the method for preventing formation of dew and/or ice on an optical glass window set forth in [1], the protective tube has a small opening perforated in the front thereof; and

[4] The method for preventing formation of dew and/or ice on an optical glass window set forth in [1] further includes the step of regulating a temperature of the protective tube.

In accordance with another aspect of the present invention,

[5] An apparatus for preventing formation of dew and/or ice on an optical glass window includes a protective tube covering an external atmosphere of the cooled optical glass window and insulated from the optical glass window so as to prevent the external atmosphere of the optical glass window from being cooled and to provide means for preventing formation of dew and/or ice on the optical glass window;

[6] The apparatus for preventing formation of dew and/or ice on an optical glass window set forth in [5] further includes a shutter closing the front of the protective tube;

[7] In the apparatus for preventing formation of dew and/or ice on an optical glass window set forth in [5], the protective tube has a small opening perforated in the front thereof;

[8] The apparatus for preventing formation of dew and/or ice on an optical glass window set forth in [5] further includes means for regulating a temperature of the protective tube;

[9] The apparatus for preventing formation of dew and/or ice on an optical glass window set forth in [8] further includes a heating tape on the side surface portion of the protective tube; and

[10] In the apparatus for preventing formation of dew and/or ice on an optical glass window set forth in [8], the temperature of the protective tube is regulated so as to inhibit convection of air in the protective tube in accordance with an inclination angle of the protective tube.

According to the present invention, an insulated protective tube is attached to the front of an optical glass window, and the air in the protective tube is heated. The heated air gently warms the glass window so as to prevent formation of dew and/or ice. Since the air is trapped in the protective tube, the air does not flow and is unlikely to cause turbulent disturbance. Also, two cases of application are possible to achieve the aim of the present invention, in which the front surface of the protective tube is closed or opened to the outside air.

In the case of closure from the outside air, the front surface of the protective tube can be temporarily opened by the shutter when exposure is performed by using a CCD camera.

Also, in the case of opening to the outside air, the protective tube is formed so as to have a smaller hole (window) for performing exposure to outside light than the protective tube, thereby achieving the aim of containing the air inside the protective tube.

BEST MODE FOR CARRYING OUT THE INVENTION

Embodiments of the present invention will be described with reference to the drawings.

Figure 1:
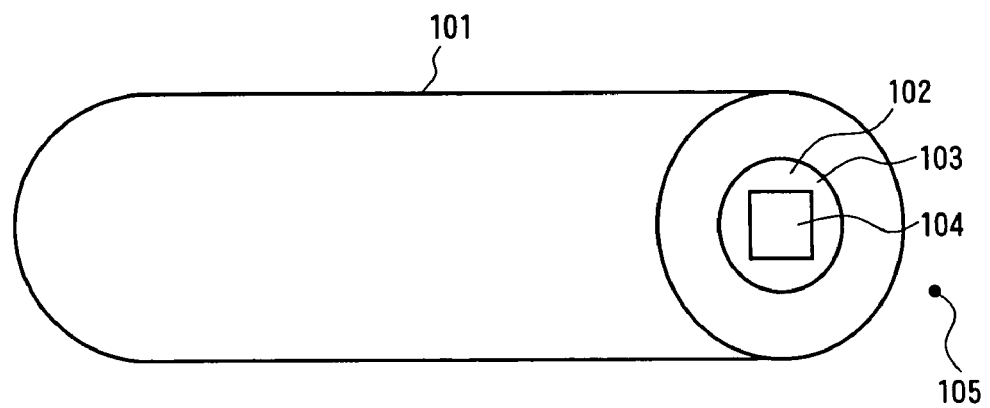
FIG. 1 is a perspective view of a known CCD camera.
Figure 2:
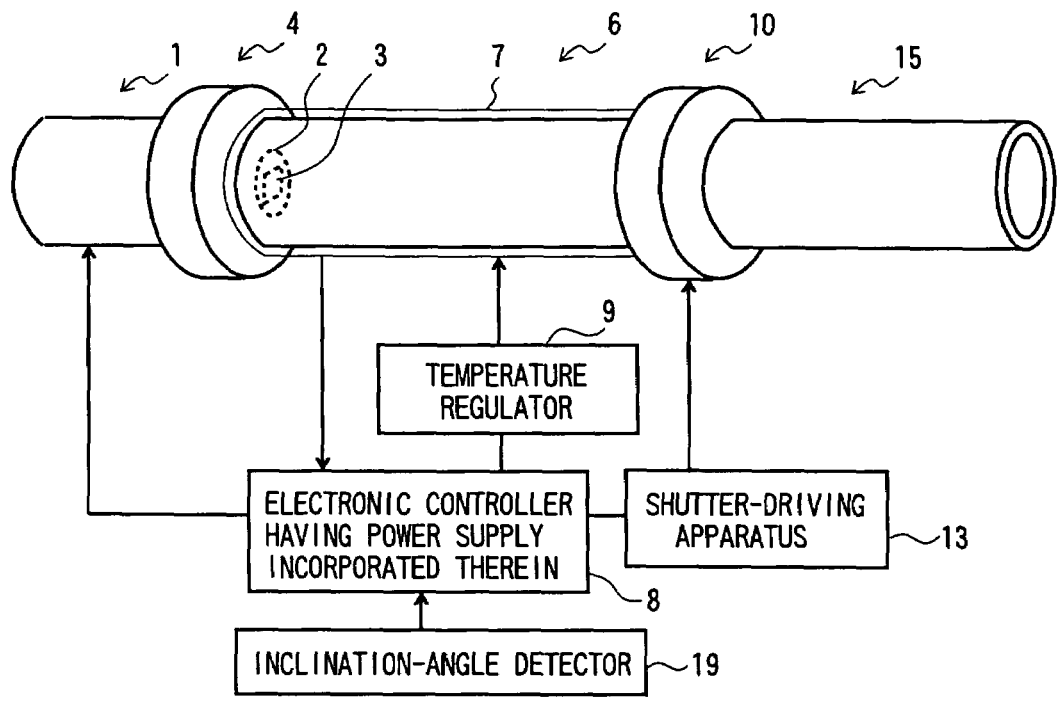
FIG. 2 is an external perspective view of an apparatus for preventing formation of dew and/or ice on an optical glass window, according to a first embodiment of the present invention.
Figure 2:
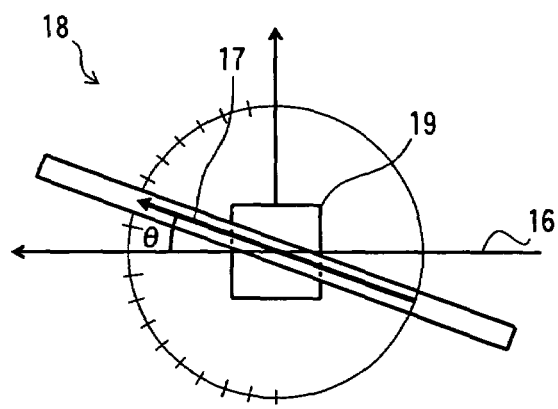
Figure 3:
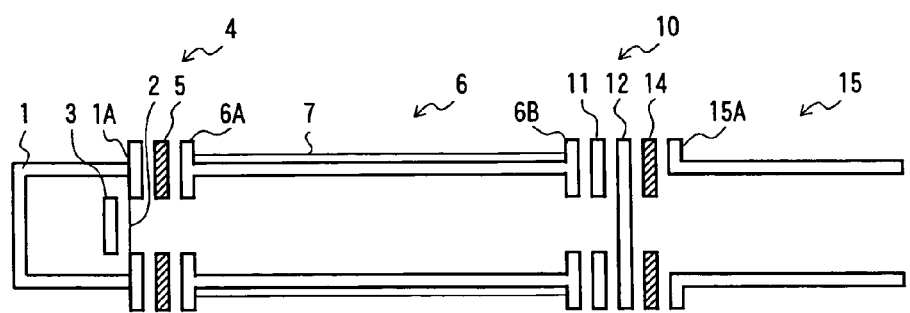
FIG. 3 is a sectional view of the apparatus for preventing formation of dew and/or ice on an optical glass window, according to the first embodiment of the present invention.

FIG. 2 is a schematic view of an apparatus for preventing formation of dew and/or ice on an optical glass window, according to a first embodiment of the present invention, wherein FIG. 2(a) is an external perspective view of the apparatus for preventing formation of dew and/or ice on an optical glass window, and FIG. 2(b) is a schematic view of an inclination-angle detector of the apparatus for preventing formation of dew and/or ice on an optical glass window. Also, FIG. 3 is a sectional view of the apparatus for preventing formation of dew and/or ice on an optical glass window.

In these drawings, with respect to reference numbers 1 to 15A, 1 represents a CCD camera, 2 represents a glass window, 3 represents a CCD enclosed inside the glass window 2, 1A represents a flange portion of the CCD camera 1, 4 represents a first joint portion, 5 represents an insulating member, 6 represents a protective tube, 6A represents a first flange portion of the protective tube 6, 6B represents a second flange portion of the protective tube 6, 7 represents a heating tape, 8 represents an electronic controller having a power supply incorporated therein, 9 represents a temperature regulator, 10 represents a second joint portion, 11 represents an iris, 12 represents a shutter, 13 represents a shutter-driving apparatus, 14 represents an insulating member, 15 represents a telescopic portion, and 15A represents a flange portion of the telescopic portion 15. Although the insulating member 5 insulating the maim body 1 of the CCD camera or the like and the protective tube 6 from each other may be composed of material such as ceramic, the material is not limited to ceramic.

With this arrangement, in this embodiment, the protective tube 6 covering an external atmosphere of the glass window 2 faced by the CCD 3 of the CCD camera 1 and insulated from the glass window 2 is provided. That is, the first flange portion 6A of the protective tube 6 is fastened to tightly seal manner to the flange portion 1A of the CCD camera 1, having the insulating member 5 interposed therebetween, so as to make up the first joint portion 4. Also, the flange portion 15A of the telescopic portion 15 is fastened in a hermetically sealed manner to the second flange portion 6B of the protective tube 6, having the iris 11, the shutter 12, and the insulating member 14 interposed therebetween, so as to make up the second joint portion 10.

In addition, the heating tape 7 serving as a heating device is bonded around the outer surface of the protective tube 6 and is connected to the electronic controller 8 having a power supply incorporated therein. Also, temperature data information of the heating tape 7 is inputted into the temperature regulator 9 so as to regulate a temperature of the heating tape 7.

Also, when the protective tube 6 is inclined upward or downward with respect to the horizontal direction (that is, has an angle of depression or elevation), as shown in FIG. 2(b), an angle θ made by a horizontal direction 16 and an inclination direction 17 of the protective tube 6 is detected by using, for example, an angle scale 18, that is, detected by an inclination angle detector (alternatively, the electronic controller may have an inclination detector or an inclination-detecting switch disposed therein) 19 detecting an angle of depression or elevation so as to regulate the temperature of the heating tape 7. When the protective tube 6 is inclined upward, an upper part of the heating tape 7 is heated so as to heat air in the upper part of the protective tube 6 and thus to cause the air in the protective tube 6 to have a temperature gradient, thereby inhibiting convection of the air in the protective tube 6.

Also, the electronic controller 8 having a power supply incorporated therein supplies power to the CCD camera 1 and, in addition, drives the shutter-driving apparatus 13 so as to open the shutter 12 only when a picture is being taken by the camera. In other words, when a picture is not being taken, the inside of the protective tube 6 is hermetically sealed and is not open to the outside air, whereby dew and/or ice is not formed on the glass window 2. Also, since the temperature of the heating tape 7 is regulated, warm air is normally filled in the protective tube 6. Accordingly, even when an outside air temperature is low, the glass window 2 is prevented from formation of dew and/or ice.

As described above, in this embodiment, although the front surface (front portion) of the protective tube is temporarily opened by the shutter when an exposure is performed by using the CCD camera, the front surface (front portion) can be always opened as described below by applying a design idea on the front surface of the protective tube.

Figure 4:
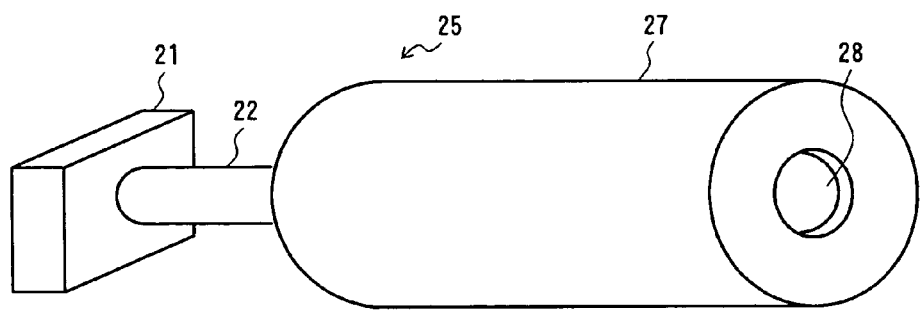
FIG. 4 is an external perspective view of an apparatus for preventing formation of dew and/or ice on an optical glass window, according to a second embodiment of the present invention.
Figure 5:
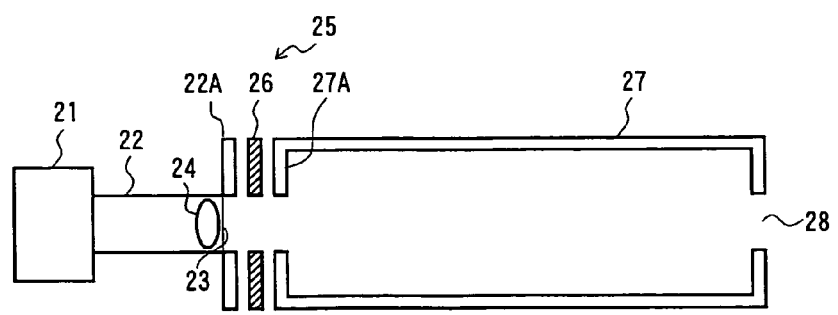
FIG. 5 is a sectional view of the apparatus for preventing formation of dew and/or ice on an optical glass window, according to the second embodiment of the present invention.

FIG. 4 is an external perspective view of an apparatus for preventing formation of dew and/or ice on an optical glass window, according to a second embodiment of the present invention, and FIG. 5 is a sectional view of the apparatus for preventing formation of dew and/or ice on an optical glass window.

In these figures, with respect to reference numbers 21 to 28, 21 represents a camera portion, 22 represents a lens portion connected to the camera portion 21, 22A represents a flange of the lens portion 22, 23 represents a glass window of the lens portion 22, 24 represents a lens, 25 represents a joint portion, 26 represents an insulating member, 27 represents a protective tube, 27A represents a flange of the protective tube, and 28 represents a small opening in the front portion of the protective tube 27.

In this embodiment, the lens portion 22 is connected to the camera portion 21, the lens 24 facing the glass window 23 is disposed in the lens portion 22, and the joint portion 25 is made up by fixing the flange 22A of the lens portion 22 to the flange 27A of the protective tube 27, having the insulating member 26 interposed therebetween. The small opening 28 is perforated in the front portion (front surface) of the protective tube 27. That is, the small opening (window) 28 for performing exposure to outside air is made smaller than the protective tube 27 so as to prevent air in the protective tube 27 from leaking outside.

Accordingly, the air in the protective tube 27 is inhibited from leaking outside, thereby effectively preventing formation of dew and/or ice on the glass window 23 of the lens portion 22.

Also, in this embodiment, since convection of the air in the protective tube 27 is inhibited in accordance with an inclination angle of the protective tube 27, a temperature regulation can be performed so as to provide a temperature gradient in the protective tube 27, thereby effectively preventing formation of dew and/or ice.

As described above, according to the present invention, a lens or a front flat filter for use not only in a research-purpose CCD camera used in a high-humidity environment but also in a general-purpose still camera or a video-TV camera used for taking a picture in an environment such as high-humidity outdoor or night time is prevented from formation of dew and, in an extremely low-temperature environment, is also prevented from formation of ice.

In the above-described embodiment, the heating tape is used as means for heating the protective tube, and the temperature thereof is controlled by a temperature sensor. Meanwhile, the means for heating the protective tube is not limited to the heating tape. A temperature to be set is intended so as to prevent formation of dew and/or ice and varies depending on an environment. This method does not exclude a case where a heating method is different from the above mentioned one. Although the heating tape may be covered by a heat-insulating member in order to effectively control the temperature thereof, the present invention covers both cases of including and excluding the heat-insulating member. The size and shape of the heating tape depend on the size and shape of an object such as a camera which is to be prevented from having dew and/or ice formed thereon.

Meanwhile, the present invention is not limited to the above-described embodiments, and a variety of modifications are possible within the scope of the spirit of the present invention. Hence, these modifications should not be excluded from the scope of the present invention.

As described above in detail, the present invention provides the following advantages.

(A) By providing a protective tube, formation of dew and/or ice is easily and simply prevented, while a turbulent disturbance is minimized and a deformation is inhibited as little as possible.

(B) By disposing an insulated protective tube in front of an optical glass window and by heating air in the protective tube, the heated air gently heats the glass window, thereby preventing formation of dew and ice.

(C) Since air is trapped in the protective tube, the air does not flow and is therefore unlikely to cause a turbulent disturbance, thus effectively preventing formation of dew and/or ice.

(D) By providing the air in the protective tube with a temperature gradient in accordance with an inclination of the protective tube, convection of the air in the protective tube can be inhibited, thereby effectively preventing occurrence of a turbulent disturbance.

INDUSTRIAL APPLICABILITY

With a method and an apparatus for preventing formation of dew and/or ice on an optical window according to the present invention, formation of dew and/or ice is easily and simply prevented while an air turbulent disturbance is minimized and a deformation is inhibited as little as possible, whereby the method and the apparatus are suitable as a method and an apparatus for preventing formation of dew and/or ice on a glass window of a CCD camera, an astronomic telescope, or the like.

What is claimed is:

1. A method for preventing formation of dew and/or ice on a cooled optical glass window, comprising the steps of:
    preventing an external atmosphere of the optical glass window from being cooled by providing a protective tube covering the external atmosphere of the cooled optical glass window and insulated from the optical glass window; and
    regulating a temperature of the protective tube so as to inhibit convection of air in the protective tube in accordance with an inclination angle of the protective tube, so as to prevent the optical glass window from having dew and/or ice formed thereon.

2. The method for preventing formation of dew and/or ice on a cooled optical glass window according to claim 1, wherein the protective tube is formed so as to be tightly sealed.

3. The method for preventing formation of dew and/or ice on a cooled optical glass window according to claim 1, wherein the protective tube has a small opening perforated in the front thereof.

4. An apparatus for preventing formation of dew and/or ice on a cooled optical glass window, comprising:
    a protective tube covering an external atmosphere of the cooled optical glass window and insulated from the optical glass window so as to prevent the external atmosphere of the optical glass window from being cooled; and
    means for regulating a temperature of the protective tube so as to inhibit convection of air in the protective tube in accordance with an inclination of the protective tube.

5. The apparatus for preventing formation of dew and/or ice on a cooled optical glass window according to claim 4, further comprising a shutter closing the front of the protective tube.

6. The apparatus for preventing formation of dew and/or ice on a cooled optical glass window according to claim 4, wherein the protective tube has a small opening perforated in the front thereof.

7. The apparatus for preventing formation of dew and/or ice on a cooled optical glass window according to claim 4, further comprising a heating tape on the side surface portion of the protective tube.

* * * * *